United States Patent [19]

Suk

[11] 4,054,222
[45] Oct. 18, 1977

[54] COVER FOR ELECTRICAL FLOOR BOXES

[75] Inventor: Eugene J. Suk, Pittsburgh, Pa.

[73] Assignee: Midland-Ross Corporation, Cleveland, Ohio

[21] Appl. No.: 646,278

[22] Filed: Jan. 2, 1976

[51] Int. Cl.² .................................................. H02G 3/08
[52] U.S. Cl. .................................... 220/3.8; 174/66; 220/3.94; 220/241
[58] Field of Search .................. 220/3.8, 3.92, 3.94, 220/241, 242, 266, 284, 306, 307, 4 E, 296, 300; 174/48, 66

[56] References Cited

U.S. PATENT DOCUMENTS

| 2,177,123 | 10/1939 | Wittenberg | 220/300 |
| 2,480,578 | 8/1949 | Hodges | 220/300 X |
| 2,800,242 | 7/1957 | Sauthoff | 220/3.8 |
| 2,907,927 | 10/1959 | Fisher | 220/3.8 X |
| 3,187,922 | 6/1965 | Hoskins et al. | 220/3.8 X |
| 3,424,341 | 1/1969 | Slapnik | 220/306 |
| 3,438,534 | 4/1969 | Zerwes | 220/241 |
| 3,729,572 | 4/1973 | Helin | 174/66 |

Primary Examiner—Stephen Marcus
Attorney, Agent, or Firm—H. Duane Switzer

[57] ABSTRACT

An electrical floor box having an opening receiving a cover formed in two pieces having mating straight walls defining a joining line extending across the opening. The cover and opening have facing peripheral walls, and tabs extend outwardly from one of the peripheral walls toward the other of the peripheral walls on opposite sides of the joining line. The other peripheral wall has recesses receiving the tabs for releasably holding the cover in the opening.

10 Claims, 10 Drawing Figures

COVER FOR ELECTRICAL FLOOR BOXES

BACKGROUND OF THE INVENTION

This application relates to the art of covers and, more particularly, to covers which are formed in two pieces and releasably held in openings. The invention is particularly applicable to covers for electrical outlet boxes or the like and will be described with particular reference thereto. However, it will be appreciated that the invention has broader aspects and the cover may be used for closing openings in support members other than electrical outlet boxes.

Electrical outlet boxes of the general type shown in U.S. Pat. No. 3,701,837 issued Oct. 31, 1972, to Fork are commonly installed in spaced-apart locations in a floor, and have electrical wires installed therein. Use of any particular outlet box depends upon the location of equipment within the building.

Prior art relating to covers which can be opened or removed for providing access to outlet boxes or the like include U.S. Pat. No. 650,432 issued May 29, 1900, to Stewart who has hinged covers so there would always be an opening through the cover even if the box was not being used. Drilling holes and inserting pins for the hinged connections is relatively expensive.

U.S. Pat. No. 900,382 issued Oct. 6, 1908, to Joynes is simply of interest for a split cover-like member.

U.S. Pat. No. 1,847,377 issued May 10, 1932, to Hubbell is of interest for an outlet box cover which is releasably held in position by spring tabs.

U.S. Pat. No. 2,800,242 issued July 23, 1957, to Sauthoff is of interest for a split cover having openings for pipes or cables. The Sauthoff cover is held in position by bolts.

U.S. Pat. No. 3,015,408 issued Jan. 2, 1962, to Campbell et al is of interest for a plastic outlet box cover which is held in position by integral tabs on the undersurface of the cover.

U.S. Pat. No. 3,335,900 issued Aug. 15, 1967, to Mackiewicz is of interest for a switch box cover having integral fingers for snapping into slots for holding the cover in position.

The following U.S. Pat. Nos. are of interest for split plastic covers: 3,729,572 issued Apr. 24, 1973 to Helin; 3,859,454 issued Jan. 7, 1975, to Mann; and 3,864,512 issued Feb. 4, 1975, to Meadow.

It is also known to have a split cover generally similar to that of Sauthoff with integral tabs on the undersurfaces of the split cover parts like those shown at 24 in FIG. 6 of Campbell. Tabs of this type which are located on the undersurface of the cover and spaced inwardly from the cover outer peripheral edge are quite difficult to release for removing the cover from the outlet box.

SUMMARY OF THE INVENTION

An opening in a support member, such as a carpet ring for an electrical floor box, has an outer opening peripheral edge, a shoulder spaced inwardly from the opening peripheral edge, and an opening peripheral wall extending between the opening peripheral edge and the shoulder. A two-piece cover is received in the opening and has an outer cover peripheral wall facing the opening peripheral wall. The two pieces of the cover have straight mating walls extending across the opening to define a joining line. Tabs extend outwardly from one of the peripheral walls toward the other on opposite sides of the joining line, and the other peripheral wall has recesses for releasably receiving the tabs to releasably hold the cover in the opening.

In a preferred arrangement, the tabs extend outwardly from the cover peripheral wall and the recesses are in the opening peripheral wall. The tabs preferably have upper surfaces spaced below the outer surface of the cover.

In one arrangement, the tabs have downwardly extending flanges having flange ends spaced outwardly from the undersurface of the cover. The recesses in the opening peripheral wall have recess entrance openings dimensioned for receiving the tabs, and recess locking portions extending from the recess entrance openings. The cover is rotatable relative to the support member for moving the tabs between the recess entrance openings and the recess locking portions.

The two pieces of the cover preferably have a plurality of knockouts spaced-apart along the mating straight walls thereof. Each cover pieces also includes a stiffening rib extending along the undersurface thereof substantially parallel to its straight wall for stiffening same against bending.

It is a principal object of the present invention to provide an improved cover for electrical floor boxes or the like.

It is a further object of the invention to provide such a cover which can be easily removed fro providing access to the box.

It is a further object of the invention to provide such a cover which is easily replaced once it has been removed for providing access to the box.

DESCRIPTION OF A PREFERRED EMBODIMENT

Figure 1:
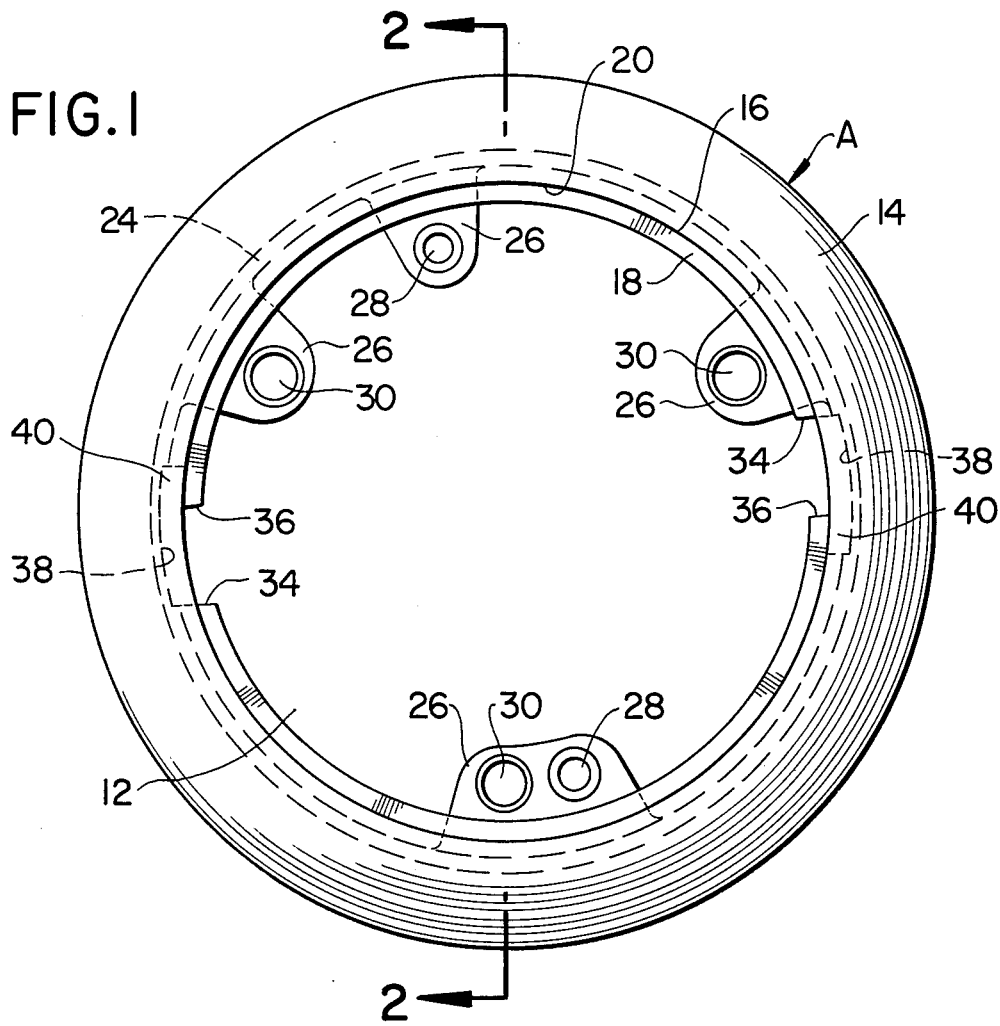
FIG. 1 is a top plan view of a carpet ring for an electrical floor box.
Figure 2:
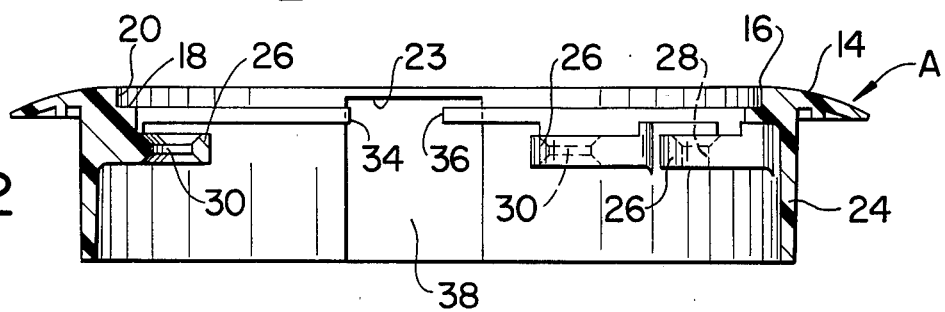
FIG. 2 is a cross-sectional elevational view taken generally on line 2—2 of FIG. 1.

With reference to the drawing, FIG. 1 shows a support member in the form of a carpet ring A having a circular central opening 12 therethrough. Support member A includes a generally circular flange 14 having an upper flange surface intersecting opening 12 at an outer or top opening edge 16. An inwardly extending shoulder 18 is spaced below or downwardly from opening edge 16. An opening peripheral wall 20 extends between opening edge 16 and shoulder 18.

A generally cylindrical wall 24 extends downwardly from flange 14 outwardly of opening 12. A plurality of circumferentially-spaced bosses 26 extend inwardly from circumferential wall 24 below shoulder 18, and have securing holes 28 and adjusting holes 30. Securing holes 28 are adapted to receive screws which are threadably received in tapped holes in an adjusting ring on a floor box. Additional adjusting screws threaded into the adjusting ring on the floor box have their heads bearing against the undersides of adjusting holes 30 so that the heads of such screws are accessible with a screwdriver through adjusting holes 30 for leveling carpet ring A.

Figure 3:
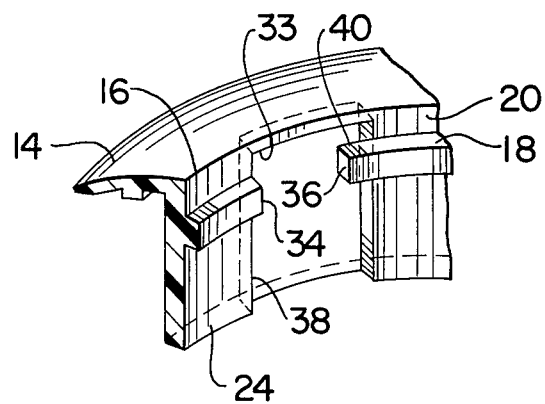
FIG. 3 is a partial perspective illustration showing a recess in the ring of FIGS. 1 and 2.

Support member A is provided with opposite recesses facing toward opening 12 for cooperating with tabs on a cover member receivable in opening 12 to releasably hold the cover in the opening. FIG. 3 shows the configuration of one recess 33. A recess entrance opening is defined between terminal ends 34 and 36 of a removed portion of shoulder 18. The inner surface of circumferential wall 24 is also notched or grooved as at 38 to provide clearance behind shoulder 18 and wall 20. The recess extends behind that portion of shoulder 18 having terminal end 36 to define a recess locking portion generally indicated at 40. The recess extends into opening peripheral wall 20 below opening edge 16 as shown in FIG. 3.

FIGS. 4–8 show a half part cooperable with a like part to form a generally circular cover. Part B has a straight mating wall 46 terminating at opposite straight wall ends 48 and 50. An arcuate outer cover peripheral wall 52 extends between opposite straight wall terminal ends 48 and 50. Cover part B has a plane outer surface 54 and an undersurface 56. Outer and under surfaces 54 and 56 intersect walls 46 and 52 at generally sharp edges. Cover part B has a thickness between outer and under surfaces 54 and 56 which is approximately the same as the distance from opening peripheral edge 16 to shoulder 18. Cover part peripheral wall 52 lies on the periphery of a circle having a center at 60 in FIG. 4, and straight wall 46 is a diameter of the circle. The circle on which peripheral wall 52 lies is generally the same or slightly smaller than the diameter of the circle on which opening peripheral wall 20 lies.

A tab 62 extends outwardly from peripheral wall 52 of cover part B and is preferably located substantially centrally between straight wall ends 48 and 50. Tab 62 has an upper tab surface 64 which is spaced below outer surface 54 substantially the same distance as the distance from opening peripheral edge 16 to the upper edge of recess 33 in FIG. 3. Tab 62 has a locking flange extending downwardly therefrom away from outer surface 54 and terminating in a locking flange end 66 which is spaced below undersurface 56. The locking flange has an inner surface 68 in FIG. 6 which is located on the periphery of a circle which is not smaller than the circle on which peripheral wall 52 lies. Preferably, inner flange surface 68 lies on the periphery of a circle which is substantially coincidental with the circle on which peripheral wall 52 lies, or on a circle which is slightly larger than the circle on which peripheral wall 52 lies. The distance from peripheral wall 52 to the outer surface of tab 62 is not greater than the distance from opening peripheral wall 20 to the back wall of recess 33.

Cover part B has a plurality of spaced-apart weakened areas along straight wall 46 thereof. These weakened areas define knockouts or notchable areas to form openings through which wires can pass in an assembled cover. Each weakened area includes an outer very thin and small weakened area 70, an intermediate slightly thicker weakened area 72 and an inner still thicker area 74 which has a thickness substantially less than the thickness of cover part B. The varying thickness or the stepped arrangement of the weakened areas selectively allows breaking away areas of different size for accommodating electrical cables or the like of different sizes.

Stiffening ribs means 78 extends downwardly from undersurface 56 of part B slightly inwardly from weakened areas 74. Stiffening rib means 78 is in the form of an elongated rib which extends in a direction between straight wall ends 48 and 50 to stiffen part B against deformation across ends 48 and 50. Rib 78 may take many forms, and in the arrangement shown is arcuately curved between straight wall ends 48 and 50. This arrangement provides the highest moment of inertia for resisting bending or breakage of part B at its center, and a smaller moment of inertia outwardly toward straight wall ends 48 and 50 where the bending moments will generally be smaller.

Figure 4:
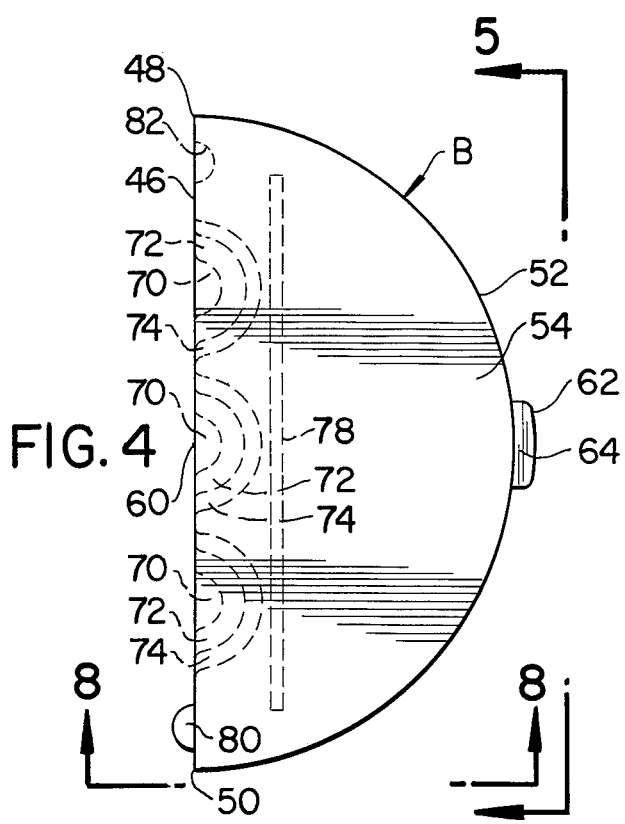
FIG. 4 is a top plan view of a half part cooperable with another like part to form a cover.
Figure 5:
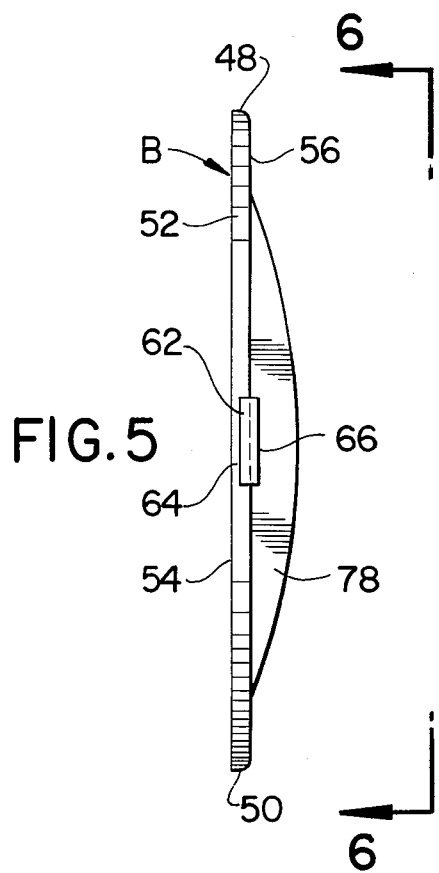
FIG. 5 is an end elevational view taken generally on line 5—5 of FIG. 4.
Figure 6:
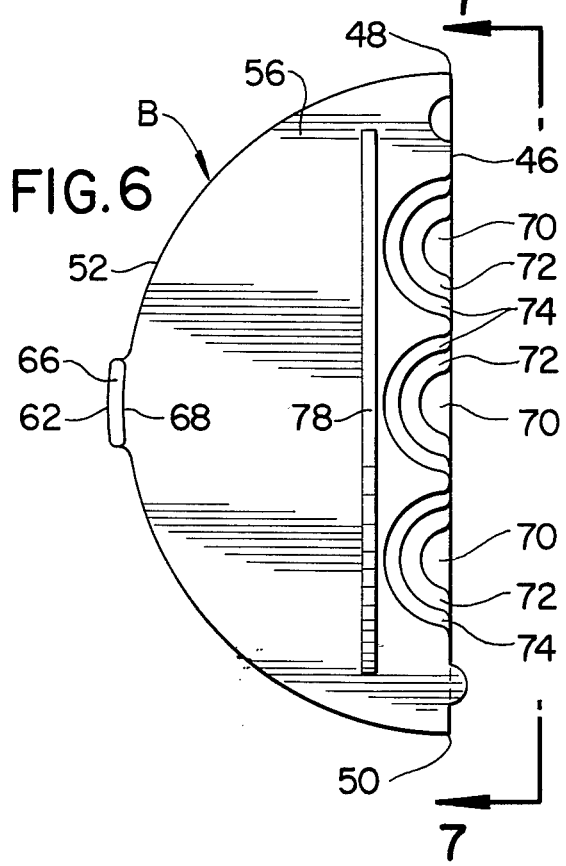
FIG. 6 is a bottom plan view taken generally on line 6—6 of FIG. 5.
Figure 7:
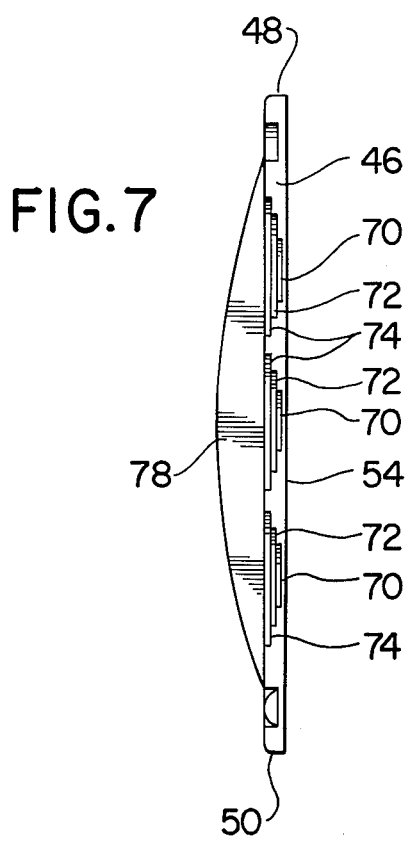
FIG. 7 is an end elevational view taken generally on line 7—7 of FIG. 6.
Figure 8:
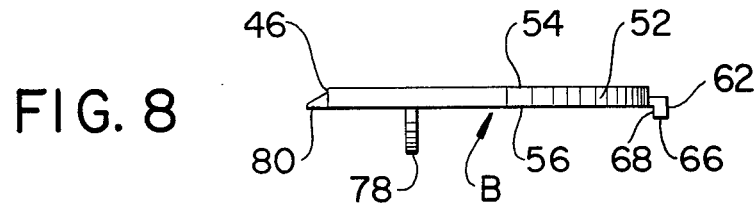
FIG. 8 is an end elevational view taken generally on line 8—8 of FIG. 7.

In one arrangement, cover part B has spaced-apart projections and recesses shown generally at 80 and 82 in FIG. 4 respectively extending outwardly and inwardly from straight wall 46 below outer surface 54 for cooperation with like projections and recesses on a like cover part. Projection 80 is spaced inwardly from straight wall end 50 the same distance as recess 82 is spaced inwardly from straight wall end 48. Therefore, when a pair of cover members B is reversely positioned with their straight walls 46 abutting one another, a projection 80 on one will be received in a recess 82 on the other. This arrangement aids in initial insertion of the cover into the opening, and also aids in holding the cover parts together once they are releasably locked within the opening in the support member.

Figure 9:
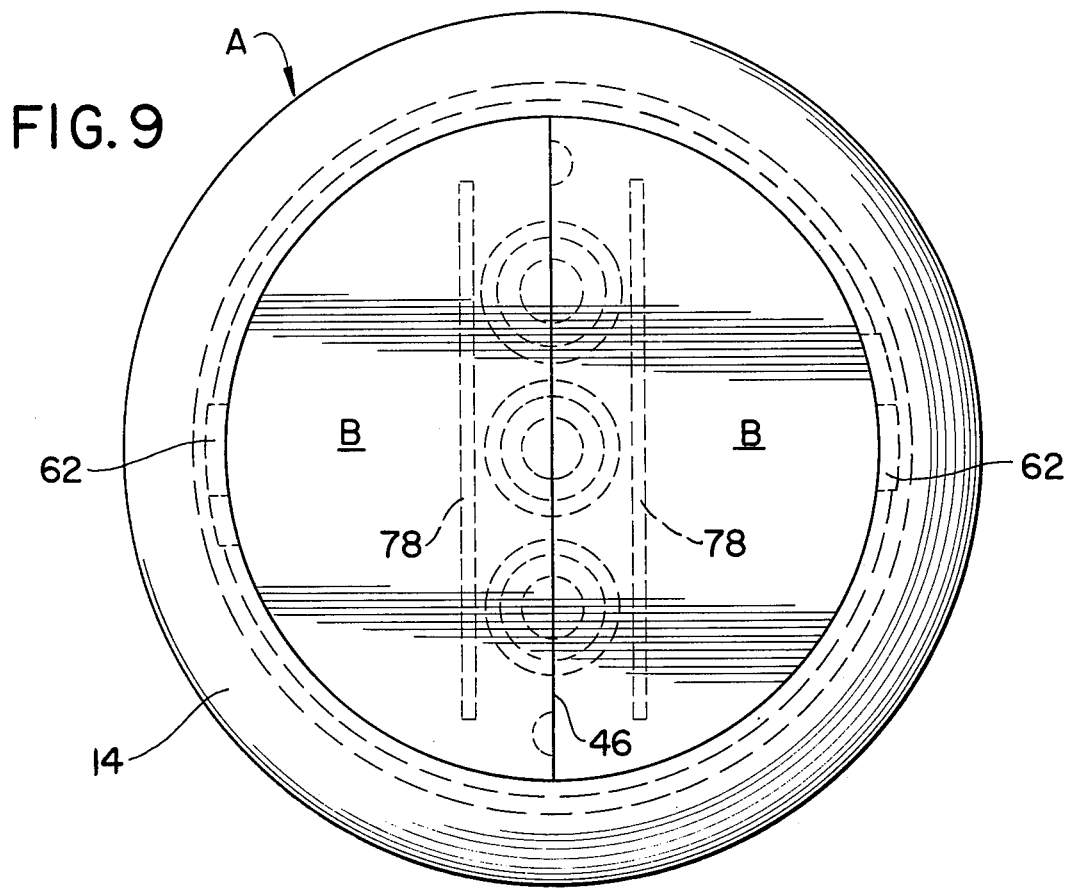
FIG. 9 is a top plan view of a carpet ring having the cover installed thereon.

FIG. 9 shows a support member A having a cover releasably held in the opening therein. Two cover parts B are positioned with their straight walls abutting one another to define a joining line indicated by numeral 46 which bisects the opening in support member A. Tabs 62 extend outwardly from the cover on opposite sides of joining line 46, and the recesses in support member A for receiving tabs 62 are also located on opposite sides of joining line 46 in alignment with tabs 62. The outer periphery of the cover is formed by outer peripheral walls 52 on parts B so that the outer peripheral wall of the cover faces peripheral wall 20 of the opening in support member A. One of the peripheral walls has tabs extending outwardly therefrom toward the other peripheral wall, and the other peripheral wall has recesses extending inwardly thereof for receiving the tabs. In the preferred arrangement, the tabs extend outwardly from the periphery of the cover member and the recesses are in the peripheral wall of the opening.

Figure 10:
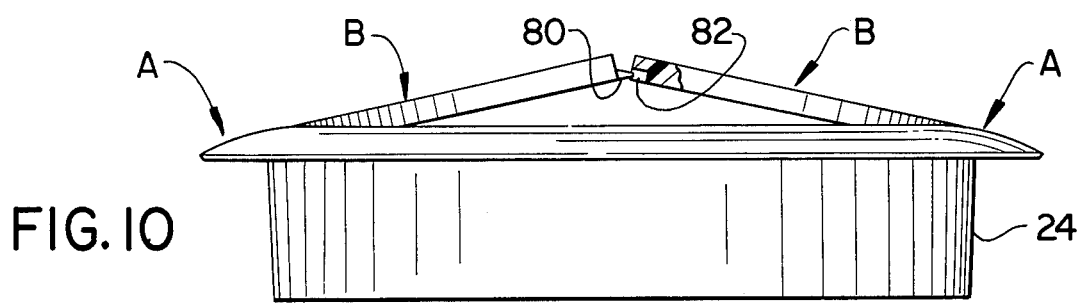
FIG. 10 is an elevational view showing the position of the two-piece cover as it is being installed or removed.

FIG. 10 shows cover parts B in an intermediate position either during positioning of a cover within the opening on the support member, or when removing the cover from the opening in the support member. The recess entrance opening defined between terminal ends 34 and 36 in FIG. 3 is at least as wide as the width of tabs 62. The two cover parts are located generally in the position of FIG. 10 and tabs 62 on the two cover parts are inserted through the recess entrance openings. Cover parts B are then allowed to fall down into a flat position so that the peripheral portion of undersurface 56 on the cover parts is supported on shoulder 18 in the opening of support member A. Pressure is then applied to outer surfaces 54 of the cover pars and a turning force applied to rotate same relative to support member A for locating the locking flanges on tabs 62 within locking recess portion 40 of the recesses. In other words, the locking flanges and inner locking flange surfaces 68 are located behind the cantilevered extension portion of support member A on which terminal end 36 of FIG. 3 is located. The cover is now firmly held against accidental removal from support member A. In order to remove the cover, it is simple rotated back to a position wherein tabs 62 are in alignment with the recess entrance openings between terminal ends 34 and 36 of FIG. 3. A fingernail or thin tool can be used for grabbing an edge of one part at joining line 46 of FIG. 9 to tilt the cover parts upwardly to the position of FIG. 10 where they can be grasped and removed from support member A. The weakened areas may be selectively removed for extending electrical cables through the openings in the two cooperating cover parts. Once cables have been extended through the openings, the cover can be repositioned within the opening and moved to a holding position with the locking flanges of the tabs received in the locking portions of the recesses.

Although the preferred arrangement shows a cover and opening which are circular, it is possible in certain arrangements to provide covers and openings of other shapes. The cover is formed from half parts in the form of generally flat members B. Support member A and cover part B are preferably each molded in one-piece of synthetic plastic material.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A support member having an opening therein, said opening having an outer opening peripheral edge, a shoulder spaced inwardly from said opening peripheral edge, an opening peripheral wall extending between said shoulder and said opening peripheral edge, a two-piece cover received in said opening and having outer and under surfaces, the outer peripheral portion of said under surface being supported on said shoulder, said cover having a cover peripheral wall facing said opening peripheral wall, said cover being in two pieces having mating straight walls extending across said opening to define a joining line, one of said peripheral walls having tabs extending outwardly therefrom on opposite sides of said joining line toward the other of said peripheral walls, said other peripheral wall having recesses receiving said tabs for releasably holding said cover from being lifted out of said openings, and said recesses having entrance openings facing laterally toward said tabs and being peripherally continuous around said entrance openings.

2. The combination of claim 1 wherein said tabs extend outwardly from said cover peripheral wall and said recesses are in said opening peripheral wall.

3. The combination of claim 1 wherein said tabs have upper surfaces spaced below said cover outer surface.

4. The combination of claim 3 wherein said tabs include downwardly extending flanges having flange ends spaced outwardly from said cover under surface.

5. The combination of claim 4 wherein said recesses include recess entrance openings dimensioned for receiving said tabs and recess locking portions extending from said recess entrance openings, said cover being rotatable relative to said support member for moving said tabs between said recess entrance openings and said recess locking portions.

6. The combination of claim 1 wherein said two pieces of said cover have a plurality of knockouts spaced-apart along said mating straight walls thereof and each said piece includes a stiffening rib extending along said under surface substantially parallel to said joining line.

7. A support having a circular opening therein receiving a circular separable cover defined by a pair of cooperating flat cover members, each said cover member having a mating straight wall for mating with a like wall on a like flat cover member, said straight wall having straight wall ends, at least one weakened area extending inwardly from said straight wall and spaced inwardly from said straight wall ends to define a knockout, said flat member having a semi-circular peripheral wall extending therearound between said straight wall ends, releasable locking tab means extending outwardly from said peripheral wall for releasably locking said cover member in an opening, said tab means including locking flanges extending substantially perpendicular to said cover, said opening in said support having a top peripheral edge, an inwardly extending shoulder spaced below said top peripheral edge, an opening peripheral wall between said top peripheral edge and said shoulder, recesses in said opening peripheral wall below said top peripheral edge, said recesses having recess entrance openings dimensioned for freely receiving said tab means, said recesses having locking portions extending from said recess entrance openings behind said shoulder, said cover members being positioned with said straight walls thereof in mating relationship to define said separable cover, and said cover having its outer peripheral under surface portion supported on said shoulder with said releasable locking tab means releasably received in said recesses for releasably locking said cover in said opening.

8. The combination of claim 7 wherein said locking flanges have inner flange surfaces intersecting the periphery of a circle which is not smaller than the periphery of the circle on which the periphery of said cover lies.

9. A support having an opening therein receiving a separable cover defined by a pair of cooperating flat cover members, each said cover member having a mating straight wall for mating with a like wall on a like flat cover member, said straight wall having straight wall ends, at least one weakened area extending inwardly from said straight wall and spaced inwardly from said straight wall ends to define a knockout, said flat member having a peripheral wall extending therearound between said straight wall ends, releasable locking tab means extending outwardly from said peripheral wall, said opening in said support having an opening peripheral wall between said top peripheral edge and said shoulder, and recesses in said opening peripheral wall spaced below said top peripheral edge, said recesses having only laterally facing recess entrance openings and being peripherally continuous around said entrance openings, said cover members being positioned with said straight walls thereof in mating relationship to define said separable cover, and said cover having its outer peripheral under surface portion supported on said shoulder with said releasable locking tab mens releasably received in said recesses for releasably locking said cover in said opening.

10. A half part cooperable with a like half part to form a cover for electrical outlet boxes or the like comprising; a substantially flat member having a mating straight wall for mating with a like wall on a like flat member, said straight wall having straight wall ends, at least one weakened area extending inwardly from said straight wall and spaced inwardly from said straight wall ends to define a knockout, said flat member having a peripheral wall extending therearound between said straight wall ends, and releasable locking tab means extending outwardly from said peripheral wall for releasably locking said half member in an opening, said tab means having a locking flange extending downwardly therefrom and terminating at a flange end spaced below the under surface of said flat member, said peripheral wall of said flat member lying on the periphery of a circle having a predetermined diameter, and said flange having an inner flange surface intersected by the periphery of a circle having a diameter substantially the same as said predetermined diameter.

* * * * *